US006820536B2

(12) United States Patent
Kijimoto

(10) Patent No.: US 6,820,536 B2
(45) Date of Patent: Nov. 23, 2004

(54) PRESSURE FRYER

(75) Inventor: Hideki Kijimoto, Nagoya (JP)

(73) Assignee: Paloma Industries Limited, Nagoya (JP)

( * ) Notice: Subject to any disclaimer, the term of this patent is extended or adjusted under 35 U.S.C. 154(b) by 0 days.

(21) Appl. No.: 10/782,425

(22) Filed: Feb. 18, 2004

(65) Prior Publication Data

US 2004/0163547 A1 Aug. 26, 2004

(30) Foreign Application Priority Data

Feb. 25, 2003 (JP) ........................................ 2003-047985

(51) Int. Cl.⁷ .............................................. A47J 37/12
(52) U.S. Cl. ............................. 99/330; 99/336; 99/403; 99/407
(58) Field of Search .................... 99/330–336, 403–417, 99/444–450, 483; 126/369, 391.1; 210/167, DIG. 8; 220/314–318, 912; 426/438, 519, 523

(56) References Cited

U.S. PATENT DOCUMENTS

| | | | | |
|---|---|---|---|---|
| 3,187,664 A | * | 6/1965 | Jennings .................... | 99/329 R |
| 3,364,845 A | * | 1/1968 | Wilson et al. ............... | 99/336 |
| 3,431,834 A | * | 3/1969 | Mainers et al. .............. | 99/336 |
| 3,501,316 A | * | 3/1970 | Guthrie, Sr. ................ | 426/296 |
| 3,608,472 A | * | 9/1971 | Pelster et al. ............... | 99/327 |
| 3,690,246 A | * | 9/1972 | Guthrie, Sr. ................ | 99/336 |
| 3,821,925 A | * | 7/1974 | Moore ....................... | 99/327 |
| 4,031,820 A | * | 6/1977 | Reed ......................... | 99/336 |
| 4,064,796 A | * | 12/1977 | Jones ....................... | 99/330 |
| 4,450,757 A | * | 5/1984 | Alfio ....................... | 99/327 |
| 4,539,898 A | * | 9/1985 | Bishop et al. .............. | 99/336 |
| 4,840,287 A | | 6/1989 | Brewer et al. | |
| 4,911,068 A | | 3/1990 | Koether et al. | |
| 4,930,408 A | | 6/1990 | King et al. | |
| 4,997,101 A | | 3/1991 | King et al. | |
| 5,033,368 A | | 7/1991 | Brewer | |
| 5,402,712 A | | 4/1995 | King et al. | |
| 5,974,955 A | | 11/1999 | King et al. | |
| 6,009,795 A | | 1/2000 | Werts | |
| 6,085,640 A | | 7/2000 | King | |
| 6,105,488 A | | 8/2000 | King et al. | |
| 6,112,646 A | | 9/2000 | King et al. | |
| 6,336,395 B1 | | 1/2002 | Tiszai | |
| 6,446,545 B2 | * | 9/2002 | Rigney ...................... | 99/339 |

* cited by examiner

*Primary Examiner*—Timothy F. Simone
(74) *Attorney, Agent, or Firm*—Burr & Brown

(57) ABSTRACT

A pressure fryer is provided which can be used as an open fryer as well. A pressure fryer (1) has a casing (2) including an oil vat (4). At the rear of the oil vat (4), a support bar 14 is perpendicularly provided, which is capable of moving upward and downward and turning. A lid (13) is connected in a lateral state to a lateral portion (20) which is provided at the top of the support bar (14). The support bar is located at the upper limit position by the momentum of a spring. With this configuration, the lid (13) can retract from an area above the oil vat (4) by turning the support bar (14) in either right or left direction.

4 Claims, 4 Drawing Sheets

PRESSURE FRYER

BACKGROUND OF THE INVENTION

This application claims the benefit of Japanese Patent Application Number 2003-47985 filed Feb. 25, 2003, the entirety of which is incorporated by reference.

1. Field of the invention

This invention relates to a pressure fryer which includes an oil vat for containing cooking oil, a heating means for heating the oil vat and a lid capable of hermetically sealing the oil vat so as to cook foods such as fried chicken or fried potatoes with heat and pressure.

2. Description of the Related Art

A conventional pressure fryer includes an oil vat provided in a casing for containing cooking oil and having an opening at the upper surface of the casing, a heating means for heating the cooking oil, such as a burner, and a lid capable of sealing the opening of the oil vat. With this structure, cooking oil in the oil vat is heated by a heating means with the opening of the oil vat closed, whereby foods put into the oil vat can be cooked with heat and pressure.

In addition, the lid can move upward and downward horizontally between a lower limit position in which the opening of the oil vat is sealed and an upper limit position in which the opening is provided by a supporting means provided on the casing. Because of this structure, a basket hanging from the lid for containing foods can be sunk in the oil vat and pulled out from the oil vat. (Please refer to Japanese Patent Examined Publication No. 6-77556 and Japanese Patent Unexamined Publication No. 2000-5082A)

In such a fryer, however, the lid is always located above the oil vat even if the lid is at the upper limit position in which the oil vat is opened. Therefore, if the fryer is used as an open fryer without using the lid, the lid could be an obstacle for cooking operation, whereby a working space is narrowed and it is not convenient.

In order to solve the above problem, an object of the present invention is to provide a fryer serving as an open fryer in which a lid is not an obstacle and having an excellent usability.

SUMMARY OF THE INVENTION

According to a first aspect of the present invention, a supporting means has a laterally moving means for retracting the lid from an area above the oil vat at the upper limit position.

According to a second aspect of the present invention, in addition to the object of the first aspect, the supporting means is a support bar which is connected to the lid at the upper portion thereof and perpendicularly provided to move upward and downward adjacent to the oil vat in the casing. Further, the support bar also serves as the laterally moving means by being provided turnably in a horizontal direction. As a result, the supporting means and the laterally moving means can be formed easily.

According to a third aspect of the present invention, in addition to the objects of the first and second aspects, the lid is capable of turning from a horizontal state to a vertical state when the lid is retracted from the area above the oil vat. As a result, it is possible to provide a wider working space at the area above the oil vat.

It should be noted that the vertical state includes not only a state where the lid turns 90 degrees from a lateral state, but a state where the lid turns less than 90 degrees from the lateral state forming an acute angle.

DETAILED DESCRIPTION OF THE PREFERRED EMBODIMENTS

Hereinafter, a preferred embodiment of the present invention will be described with reference to the accompanying drawings.

Figure 1:
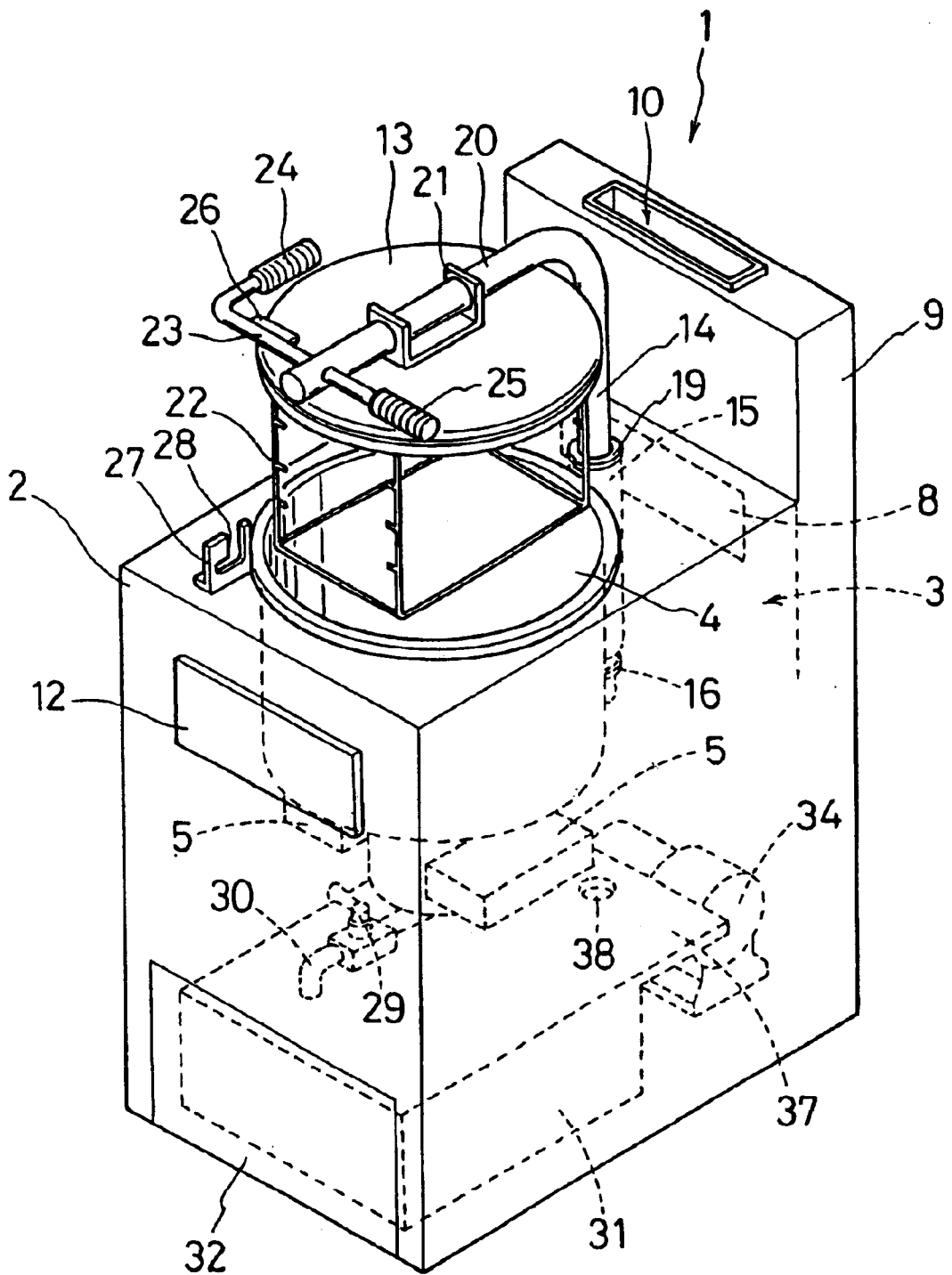
FIG. 1 is a perspective view of a pressure fryer.
Figure 2:
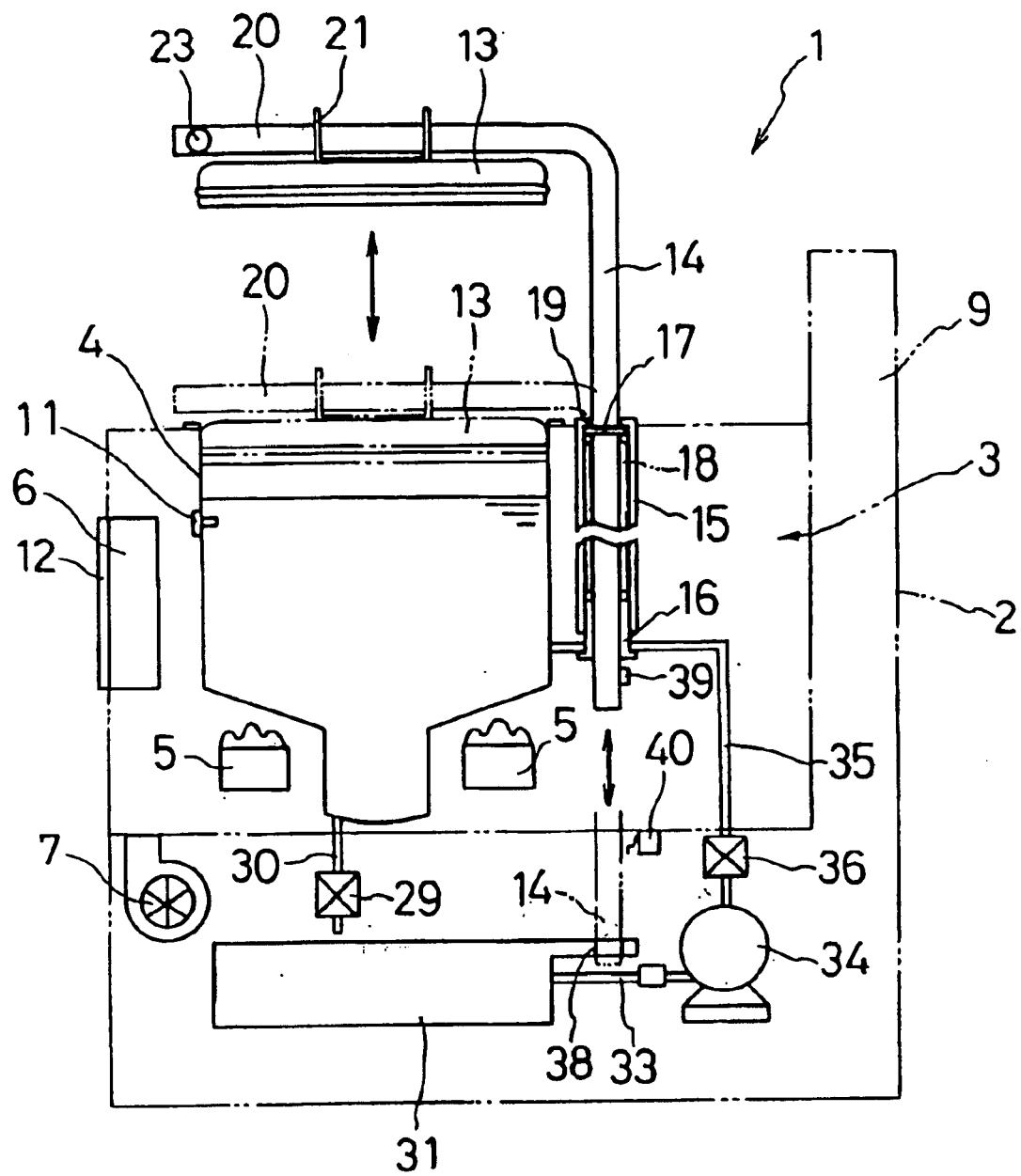
FIG. 2 is a schematic view of a pressure fryer.

FIG. 1 is a perspective view of a pressure fryer as an embodiment of the present invention, and FIG. 2 shows a schematic view thereof. A fryer 1 has a box-shaped casing 2 which includes a combustion chamber 3. In the combustion chamber 3, an oil vat 4 for containing cooking oil having an opening at the top thereof and a pair of burners 5, 5 located under the oil vat 4 for heating the same from the bottom thereof are provided. Each of the burners 5 is operated to implement combustion on/off by a burner controller 6 provided in the casing 2. The number 7 indicates a blower for providing combustion air to the combustion chamber 3, and the blower is controlled to be driven by the burner controller 6. An exhaust vent 8 for combustion exhaust gas is provided at the upper rear of the combustion chamber 3. The exhaust vent 8 communicates with an exhaust chamber 10 having an opening at the top and being formed in a rear wall 9 which is provided perpendicularly at the rear of the casing 2.

Moreover, in the oil vat 4, a temperature sensor 11 is provided for detecting a cooking oil temperature to be inputted to the burner controller 6.

On the other hand, at the front of the casing 2, there is provided a cooking controller 12 electrically connected to the burner controller 6. The cooking controller 12 has a display portion (not shown), a switch for starting cooking and an operating portion where cooking menus, such as a set temperature and a cooking time, can be selected. When a certain cooking menu is selected using the cooking controller 12 and the switch is turned ON, the burner controller 6 monitors a cooking oil temperature obtained from the temperature sensor 11 according to the selected cooking menu. Further, the burner controller 6 carries out an on/off control so that the burners operate intermittently for a predetermined period to heat the cooking oil of the oil vat 4.

At the upper portion of the oil vat 4, a circular lid 13 is supported movably upward and downward by a support bar 14 serving as a supporting means including a laterally moving means. This support bar 14 is held turnably and movably upward and downward within a supporting sleeve 15 provided perpendicularly at the rear (inward) of the oil vat 4 in the casing 2. A coil spring 18 is provided between an adjusting sleeve 16 and a flange 17. The adjusting sleeve 16 is threadably attached at the bottom of the supporting sleeve 15 so as to be penetrated by the support bar 14. The flange 17 is provided around the top of the support bar 14. With the momentum of the coil spring 18, in a normal state, the flange 17 reaches the upper limit position in FIG. 1 and 2 abutting a stopper 19 at the top of the support sleeve 15. When the support bar 14 is moved downward against the momentum of the coil spring 18, the lid 13 is inserted into the opening of the oil vat 4 at the lower limit positions which enables to close the same. It should be noted that this momentum is adjustable by changing length of screw of the adjusting sleeve 16 into the supporting sleeve 15.

The upper end of the supporting bar 14 serves as a lateral portion 20 by being bent toward the front at a right angle. This lateral portion 20 connects the lid 13 to the support bar 14. That is, the lateral portion .20 penetrates an open-box-shaped connecting plate 21 which is fixed at an upper center of the lid 13. As a result, the lid 13 is supported turnably around the lateral portion 20.

The number 22 indicates a metal basket which is hanging from the bottom surface of the lid 13 and capable of holding a plurality of gauze on which foods are disposed. The basket 22 can be sunk into the cooking oil in the oil vat 4 at the lower limit position and is arbitrary attachable and detachable to/from the lid 13.

At the tip of the lateral portion 20, a lock bar 23 with handles 24, 25 at the right and left ends is orthogonally inserted with a play turnably as well as slidably. Then, the support bar 14 can be moved upward and downward by gripping the handles 24, 25. The left end of the lock bar 23 including the handle 24 is bent at right angle so that the lock bar 23 can be easily turned and slid. A plate-shaped stopper 26 protrudes at the lateral side of the lock bar 23 between the handle 24 and the lateral portion 20. The stopper 26 is protruding along the lock bar 23 in the bending direction of the handle 24.

On the other hand, at the top of the casing 2, a lock plate 27 having a notch 28 is protruded. The notch 28 enables the lock bar 23 to be fitted to the lock plate 27 at the lower limit position when the lid 13 is inserted into the opening of the oil vat 4. The notch 28 is L-shaped so that the stopper 26 can be inserted into the same with the handle 24 turned to the front side.

At the bottom of the oil vat 4, a drain duct 30 having a valve 29 which can be manually opened or closed is connected. Below the drain duct 30, a tank 31 with a filter (not shown) for storing drained cooking oil is housed such that it can be freely stored or drawn through a door 32 provided at the front of the casing 2. At the rear of the tank 31, a pump 34 is provided to which an inlet pipe 33 is connected when the tank 31 is inside the casing 2. The pump 34 also has an outlet pipe 35 connected to the oil vat 4. This outlet pipe 35 has an electromagnetic valve 36 controlled to be opened/closed with a burner controller 6. With the above structure, a filtering device operates as follows. When a filtering switch on the cooking controller 12 is turned ON, the burner controller 6 opens the electromagnetic valve 36. At the same time, the pump 34 is driven to filter cooking oil stored in the tank 31 and return the same to the oil vat 4.

The tank 31 has a plate-shaped lock portion 37 extending rearward. The lock portion 37 has a hole 38 into which the bottom end of the support bar 14 can be inserted at the lower limit position as indicated with a phantom line in FIG. 2. At the lower limit position, since the support bar 14 is inserted, the tank 31 can not be drawn from the casing 2. Further, below the support bar 14 a micro switch 40 is provided, while a projection 39 protrudes at the lateral side of the support bar 14. Then, when the support bar 14 is moved downward, the micro switch 40 is turned ON touched by the projection 39. In addition, the burner controller 6 opens the electromagnetic valve 36 and operates the pump 34 only when an ON signal of the micro switch 40 is obtained during the filtering switch being ON.

In a pressure fryer 1 configured as described above, the following is an ordinary cooking with heat and pressure. First, the handles 24, 25 of the lock bar 23 are gripped so that the lid moves downward with the support bar 14 against the momentum of the coil spring 18. When the lid 13 is inserted into the opening of the oil vat 4 at the lower limit position, the handle 24 of the lock bar 23 is turned to the front side, whereby the lock bar 23 is fitted into the lock plate 27. Thereafter, the handle 24 is slid to the left, so that the stopper 26 engages with the notch 28 of the lock plate 27 for preventing the lock bar 23 from turning. As a result, the lid 13 and the support bar 14 are locked at the lower limit position. Therefore, when a certain cooking menu is selected using the cooking controller 12 and a switch for starting cooking is turned ON, foods are cooked with heat and pressure in the oil vat 4 being hermetically sealed. The lid 13 has a pressure release valve (not shown) to maintain the pressure in the oil vat 4 within a predetermined value.

When cooking is finished, the handle 24 is gripped to slide the lock bar 23 in the right direction. Then the stopper 26 is released from the lock plate 27 and the lock bar 23 is unlocked. After that, the handles 24, 25 are gripped in order to lift the lid 13 and the support bar 14 to the upper limit position. Whereby, the oil vat 4 is opened and foods can be taken out. Lifting the lid 13 and the support bar 14 can be easily conducted using the momentum of the coil spring 18.

Figure 3:
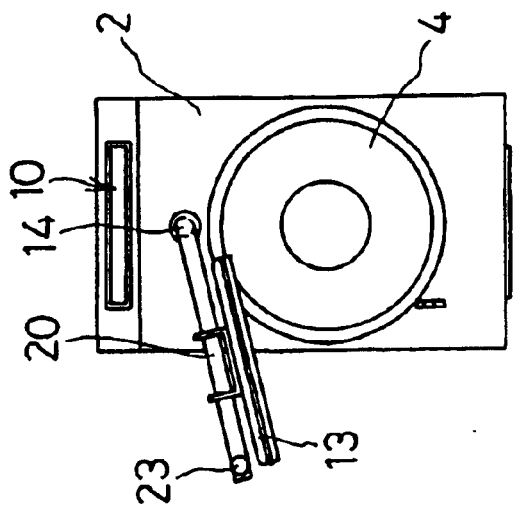
FIG. 3(A) is a plain view of a pressure fryer (wherein a lid is located at the upper limit position).
FIG. 3(B) is a plain view of a pressure fryer (wherein a lid is located at a retracted position).
FIG. 3(C) is a plain view of a pressure fryer (wherein a lid is located at the retracted position and turned to a vertical state).
Figure 3:
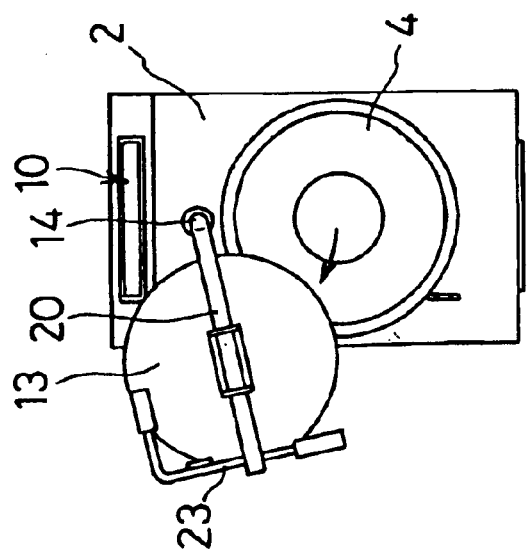
Figure 3:
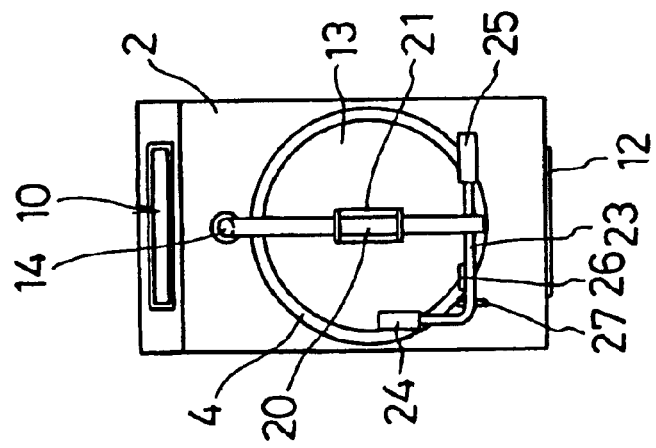

It should be noted that the pressure fryer 1 can be used as an open fryer in which the lid is not used for the oil vat 4 as follows. First, the lid 13 at the upper limit position in FIG. 3(A) is turned either in the right or left direction (in FIG. 3, in the left direction) around the support bar 14 as shown in FIG. 3(B). Then, the lid 13 is retracted from the front to the rear of the oil vat 4, so that it is provided an opening above the oil vat 4. In this way, the pressure fryer 1 can be easily used as an open fryer. Further, as shown in FIG. (C), when the lid is turned around the lateral portion 20 to obtain a vertical state, it will be substantially an open area above the oil vat 4, which enables to produce a wider working space.

According to a fryer 1 of the above-described embodiment, the support bar 14 serving as a supporting means for the lid 13 has a laterally moving means which retracts the lid 13 from an area above the oil vat 14 at the upper limit position. By doing this, it is possible to easily use the fryer 1 as an open fryer in which the lid is not an obstacle, thereby having an excellent usability.

Moreover, the supporting means is a support bar 14 connected to the lid 13 which is a lateral state at the upper portion and perpendicularly provided to move upward and downward at the rear of the oil vat 4 in the casing 2. In addition, the support bar also serves as a laterally moving means by being provided turnably in a horizontal direction. By doing this, the supporting means including the laterally moving means can be formed easily.

Moreover, the lid 13 is capable of turning from a horizontal state to a vertical state when the lid 13 is retracted from the area above the oil vat 4. Therefore, by turning the retracted lid 13 to the vertical state, a wider working space can be provided.

In the above embodiment, the lid turns to the vertical state by 90 degrees, however, it is not limited to this angle. The lid may turn less than 90 degrees forming an acute angle as long as an area above the oil vat is opened. In addition, a connecting part between the lid and the lateral portion of the support bar may be a sleeve in which the lateral portion is inserted with a play instead of the connecting plate.

Figure 4:
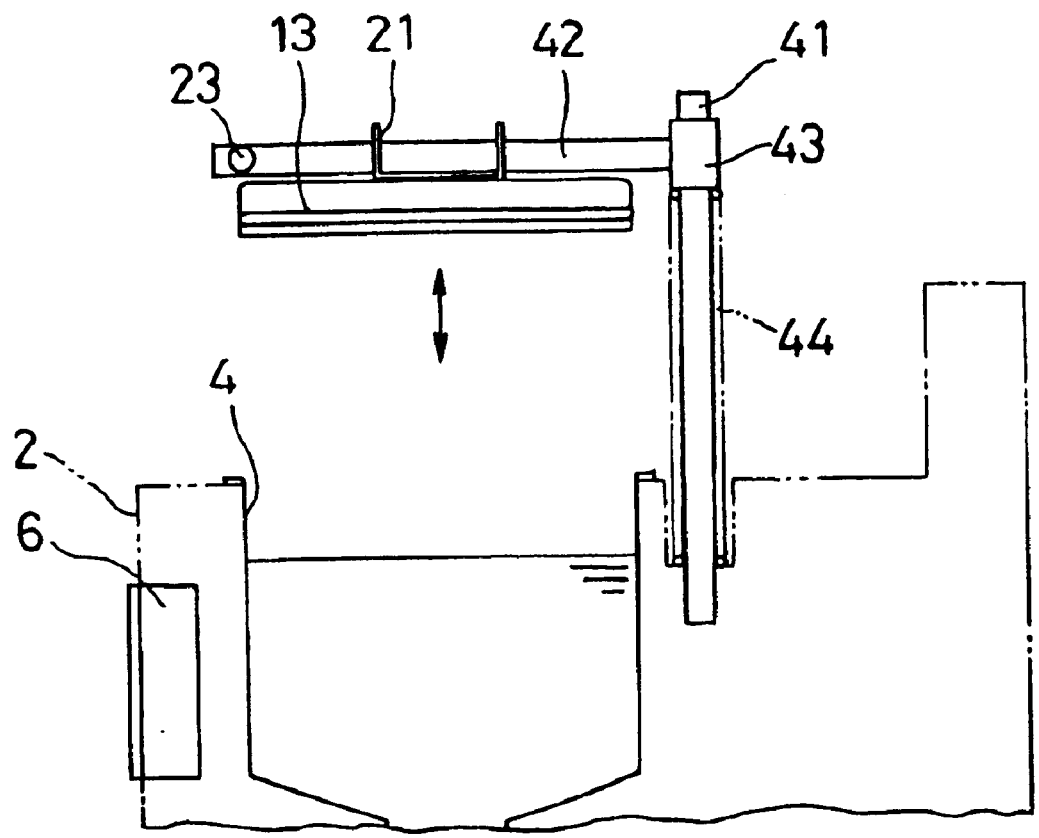

As shown in FIG. 4, another configuration may be adopted as a supporting means having the laterally moving means of the lid. First, a support bar 41 is perpendicularly provided with the casing 2, and a lateral bar 42 for supporting the lid 13 is connected to the support bar 41 via a sleeve 43 movably upward and downward as well as turnably in a horizontal direction. Thereafter, a coil spring 44 covered with the support bar 41 is provided between the sleeve 43 and the casing 2. With these structure, the lateral bar 42 can be located at the upper limit position by the momentum of the coil spring 44. Further, a modification is acceptable in this case. For example, instead of the support bar, a moving body ascending and descending along a rail on a wall may be provided. In this case, a lateral bar is connected to the moving body turnably in a horizontal direction.

In addition, an impetus means used in these supporting devices is not limited to a compression spring. It is possible to apply an extension spring to pull out the supporting means until the upper limit position in a supporting device structure. Moreover, the impetus means can be omitted if a lock device is applied to prevent the descent of the supporting means at the upper limit position.

Further, it is unnecessary to turn the lid to a vertical state as long as a sufficient space above the oil vat is provided when the support bar is turned to the retracted position. Therefore, in such a case the lateral portion of the support bar and the lid can be integrated.

According to the first aspect of the invention, the supporting means has a laterally moving means for retracting the lid from an area above the oil vat at the upper limit position. By doing this, the lid is not an obstacle and having an excellent usability when the pressure fryer is used as an open fryer.

According to the second aspect of the invention, in addition to an advantageous effect of the first aspect, the supporting means is a support bar which is connected to the lid at the upper portion thereof and perpendicularly provided movably upward and downward adjacent to the oil vat in the casing, and the support bar also serves as the laterally moving means by being provided turnably in a horizontal direction. By doing this, the supporting means and the laterally moving means can be formed easily.

According to the third aspect of the present invention, in addition to the advantages of the first and second aspects, the lid is capable of turning from a horizontal state to a vertical state when the lid is retracted from an area above the oil vat. Whereby, a wider working space above the oil vat can be provided.

What is claimed is:

1. A pressure fryer comprising:

an oil vat which is provided in a casing for containing cooking oil and having an opening at the upper surface of the casing;

a heating means for heating the cooking oil;

a lid which is capable of sealing the opening of the oil vat, and a supporting means for supporting the lid movably upward and downward in a horizontal state between a lower limit position in which the opening of the oil vat is sealed and an upper limit position in which the opening is provided, wherein the supporting means has a laterally moving means for retracting the lid from an area above the oil vat at the upper limit position.

2. A fryer as claimed in claim 1, wherein the supporting means is a support bar which is connected to the lid at the upper portion thereof and perpendicularly provided to move upward and downward adjacent to the oil vat in the casing, and the support bar also serves as the laterally moving means by being provided turnably in a horizontal direction.

3. A fryer as claimed in claim 1, wherein the lid is capable of turning from a horizontal state to a vertical state when the lid is retracted from the area above the oil vat.

4. A fryer as claimed in claim 2, wherein the lid is capable of turning from a horizontal state to a vertical state when the lid is retracted from the area above the oil vat.

* * * * *